United States Patent
Lerman et al.

(10) Patent No.: US 8,726,325 B2
(45) Date of Patent: May 13, 2014

(54) METHOD AND APPARATUS FOR SCHEDULING DELIVERY OF VIDEO AND GRAPHICS

(75) Inventors: Jesse Samuel Lerman, Cranbury, NJ (US); Paul Andrews, Titusville, NJ (US)

(73) Assignee: Telvue Corporation, Mount Laurel, NJ (US)

( * ) Notice: Subject to any disclaimer, the term of this patent is extended or adjusted under 35 U.S.C. 154(b) by 1541 days.

(21) Appl. No.: 11/501,218

(22) Filed: Aug. 8, 2006

(65) Prior Publication Data

US 2007/0033612 A1    Feb. 8, 2007

Related U.S. Application Data

(60) Provisional application No. 60/706,386, filed on Aug. 8, 2005.

(51) Int. Cl.
  *H04N 7/173*    (2011.01)
  *G06F 3/00*     (2006.01)
  *G06F 13/00*    (2006.01)
  *H04N 5/445*    (2011.01)

(52) U.S. Cl.
  USPC ............ 725/109; 725/116; 725/131; 725/37; 715/700

(58) Field of Classification Search
  None
  See application file for complete search history.

(56) References Cited

U.S. PATENT DOCUMENTS

| | | | |
|---|---|---|---|
| 6,463,587 B1 | 10/2002 | Takahashi et al. | |
| 6,552,750 B1 * | 4/2003 | Suen et al. | 348/561 |
| 6,738,972 B1 * | 5/2004 | Willard et al. | 718/103 |
| 6,909,743 B1 | 6/2005 | Ward et al. | |
| 6,912,251 B1 | 6/2005 | Ward et al. | |
| 2002/0069411 A1 * | 6/2002 | Rainville et al. | 725/37 |
| 2003/0018609 A1 * | 1/2003 | Phillips et al. | 707/1 |
| 2003/0027517 A1 * | 2/2003 | Callway et al. | 455/3.01 |

OTHER PUBLICATIONS

"AirWave Video Server Solutions," Copyright TeL Systems 2004.
Lippman, A. and Kermode, R., "Media Banks: Entertainment and the Internet," IBM Systems Journal, vol. 35, Nos. 3&4, 1996, pp. 272-291.
"Oracle® Video Server in the Broadcast Industry," An Oracle Technical White Paper, Oracle Corporation, Apr. 1999, pp. 1-15.
"Crispin Showcases Automation Solutions At NAB2005," Press Release, Crispin Corporation, Apr. 29, 2005.
Winchester, Randy, "A Video Server for $300 + Change?", Version 2, Apr. 3, 2002, pp. 1-8.
"Leightronix Nexus Ships with Advanced Digital Messaging Features," press release, Leightronix, Inc., Jul. 15, 2005.

(Continued)

*Primary Examiner* — Mark D Featherstone
(74) *Attorney, Agent, or Firm* — Moser Taboada

(57) ABSTRACT

A method and apparatus for scheduling delivery of graphics and video to an on-screen display is described. The method comprises accessing a schedule comprising at least one video, at least one template, and layout information, wherein the at least one video and the at least one template are associated with each other and scheduled to run at least one start time. In one embodiment, the system is a video server that provides a combined output stream of both video and graphics to a set top box, TV, computer or other display device. In another embodiment of the invention, the video server creates a script that relates video, graphics, and layout information to each other as web components. The web components are provided from the video server to a set top box, and the set top box utilizes a web browser to assemble the web components together.

22 Claims, 5 Drawing Sheets

(56) References Cited

OTHER PUBLICATIONS

"Leightronix Unveils Specialized Automation Controller at NAB 2005," press release, Leightronix, Inc., Feb. 17, 2005.

"Nexus," product description, Leightronix, Inc., Apr. 2005.

"Cablecast™ Version 4.2 End User Documentation," Tightrope Media Systems, Feb. 1, 2005, pp. 1-261.

* cited by examiner

| 202 | 204 | 206  118 | 208 |
|---|---|---|---|
| VIDEO CLIP | TEMPLATE | LAYOUT GRAPHICS; VIDEO | START TIME |
| VIDEO 1 | TEMPLATE 1 | 2,3; 1 | 0:00:00  — 210 |
| VIDEO 2 | TEMPLATE 1 | 1,3; 2 | 4:00:00  — 212 |
| VIDEO 3 | TEMPLATE 2 | 1,2,3; 4 | 7:00:00  — 214 |
| VIDEO 2 | TEMPLATE 2 | 1,2,3; 4 | 15:00:00 — 216 |
FIG. 2
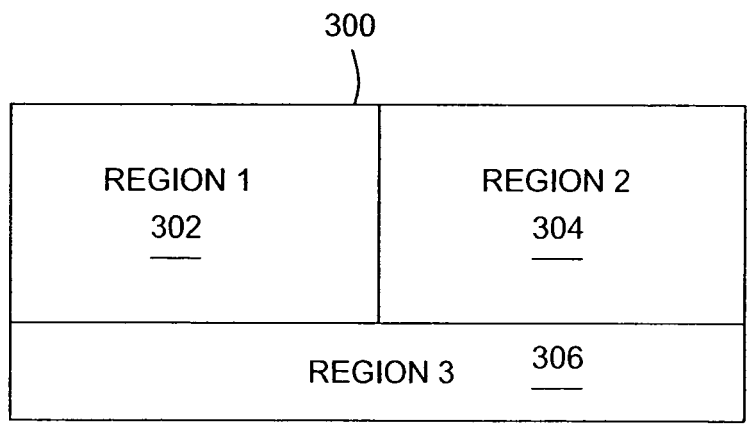
FIG. 3
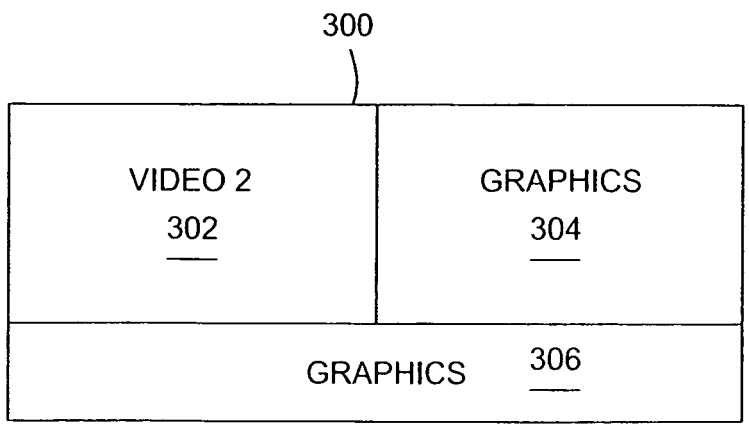
FIG. 4

METHOD AND APPARATUS FOR SCHEDULING DELIVERY OF VIDEO AND GRAPHICS

CROSS-REFERENCE TO RELATED APPLICATIONS

This application claims benefit of U.S. provisional patent application Ser. No. 60/706,386, filed Aug. 8, 2005, which is herein incorporated by reference.

BACKGROUND OF THE INVENTION

1. Field of the Invention

Embodiments of the present invention generally relate to a video server and, more particularly, a video server capable of scheduling delivery of video and graphics to an on-screen display.

2. Description of the Related Art

The Internet is used by millions of people today to access information via the World Wide Web (WWW). The information is typically displayed as a hypertext markup language (HTML) document, commonly referred to as a web pages. Information accessed via the Internet commonly includes news reports, financial reports, e.g., stock quotes, weather, and sports scores. The information from the Internet can be accessed using a variety of client devices, including personal computers, personal digital assistants (PDAs), cellular telephones, and other Internet connected devices. The Internet is often used to obtain information that is very current, i.e., information that is updated in real-time, often by the second.

Broadcast television or video is also watched by many people as a source of obtaining information. Many people watch newscasts as an alternative to obtaining information via the Internet. Television is also a primary source of home entertainment in today's society.

Combining web page graphics and video is a tedious process requiring user intervention to align the video and graphics, and then combine them into a single output stream. The stream may be stored for streaming to viewers at a later time in accordance with a broadcast schedule. Combining graphics and video in an a-priori manner is not flexible and cannot accommodate the use of "real-time" graphics.

Therefore, there is a need in the art for a method and apparatus that combines video and graphics using an ad hoc format and delivers the video and graphics to an on-screen display.

SUMMARY OF THE INVENTION

The present invention generally relates to a video server capable of scheduling delivery of video and graphics using an ad hoc format to an on-screen display. The method comprises accessing a schedule that identifies at least one video and at least one graphical template. The at least one video and the at least one graphical template are associated with each other and scheduled to run at an at least one start time. Each graphical template contains at least one region and graphic objects in each region may be independently scheduled. By providing a plurality of graphical templates, objects and video clips, the method can flexibly assemble and stream, in an ad hoc format, a series of combinations of graphics and video to at least one viewer. The apparatus comprises a video server for scheduling and formatting an output stream for delivery to a set top box, computer, or TV where the output stream comprises video and graphical content.

BRIEF DESCRIPTION OF THE DRAWINGS

So that the manner in which the above recited features of the present invention can be understood in detail, a more particular description of the invention, briefly summarized above, may be made by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is one embodiment of a schedule used in accordance with the present invention;

FIG. 3 is a representation of a three-region template for displaying video and graphics;

FIG. 4 is a representation of a three-region template displaying video and graphics;

DETAILED DESCRIPTION

The present invention comprises a video server that flexibly formats a video stream comprising graphics and video on a scheduled basis.

Figure 1:
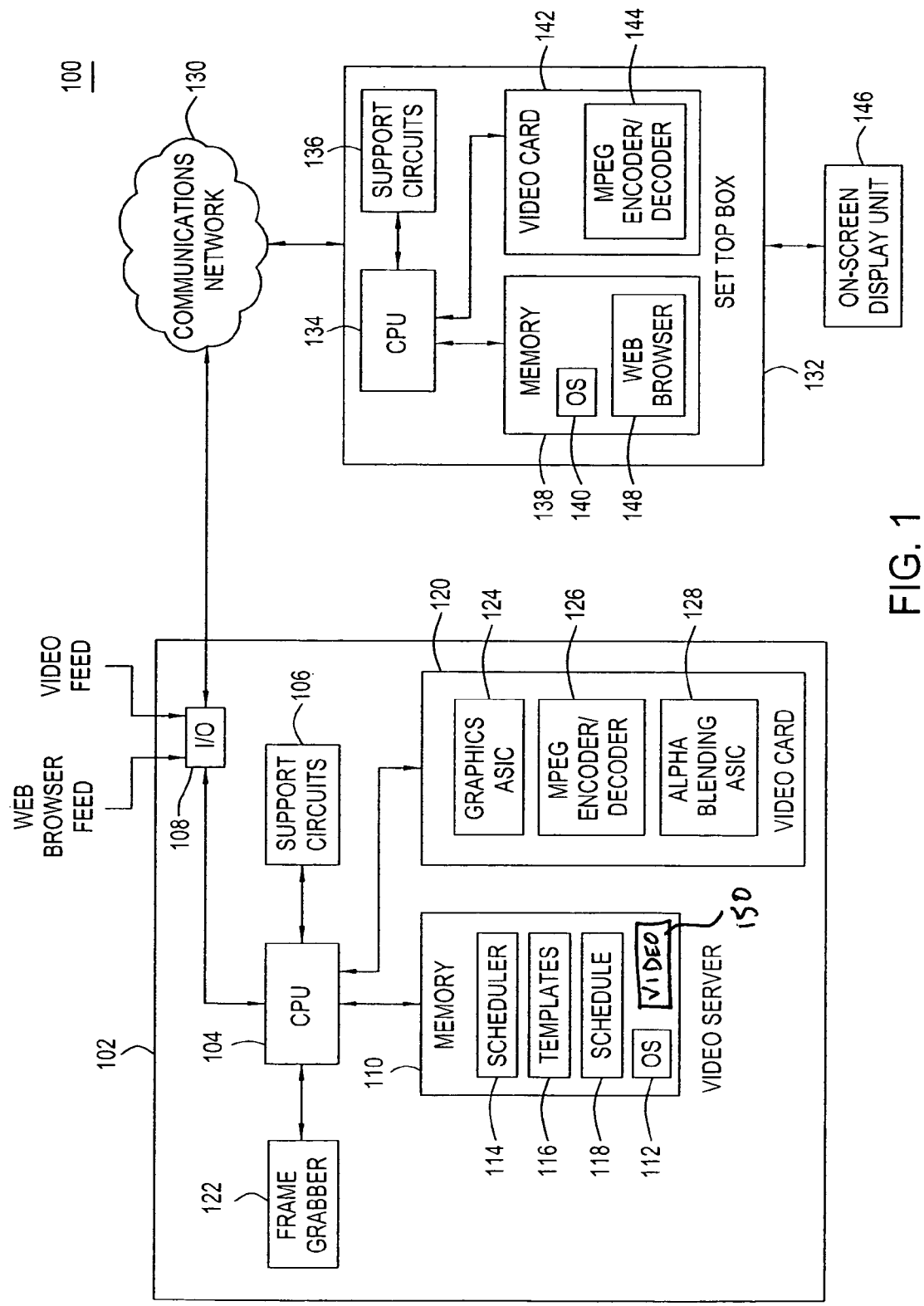
FIG. 1 is an environment in which the present invention can be utilized.

FIG. 1 is an environment in which the present invention can be utilized. The environment 100 comprises a video server 102, a communications network 130, a set-top box (STB) 132, and an on-screen display unit 146.

The video server 102 comprises a central processing unit (CPU) 104, support circuits 106, a memory 110, a frame grabber 122, a video card 120, and an input/output interface circuit. The central processing unit 104 may include one or more commercially available microprocessors or microcontrollers. The support circuits 106 are well known in the art and include power supplies, clock circuits, cache, and the like.

Memory 110 may comprise random access memory, read-only memory, removable memory, disk drives, flash memory, optical storage, and various combinations of these types of memory or storage. The memory 110 is sometimes referred to as main memory and in part may be used as cache memory or buffer memory. The memory 110 stores various software packages, such as an operating system (OS) 112, a scheduler 114, graphical templates 116, video 150 and a schedule 118.

The operating system 112 may be any standard operating system such as LINUX, MICROSOFT WINDOWS and the like. The scheduler 114 reads a system time from a system clock (generally part of the support circuits 106) and executes the schedule 118 in accordance with the system time. The schedule 118 (further described with respect to FIG. 2 below) contains a list of video dips 150 and graphical templates 116 and a start time. If the system time matches a start time on the schedule 118, e.g., for example the system time is 9:30 AM and the schedule 118 contains a start time of 9:30 AM, then the scheduler 114 will cause the video clip 150 and a graphical template 116 to be transmitted from the video server 102. In one embodiment of the invention, the video clip 150 and graphical template 116 are combined and encoded into a video stream (e.g., an analog stream, and uncompressed digital stream, or an MPEG compliant steam) or, in another embodiment, the video 150 and template 116 are sent as separate components of a web page to be assembled by the set top box 132 for display. The video and graphical template do not have to start at the same time. The video may start at one time and then an overlay may be added at a later time, or vice versa.

The graphical templates 116 may be obtained from a web browser feed or created locally then stored on the video server 102. The graphical templates 116 may include web graphics, web pages coded in Hypertext Markup Language (HTML), JAVA and ACTIVE-X applications, and the like. The templates 116 may be used to provide information from the web browser feed, such as continuously updated financial information, weather information and sports scores, to the on-screen display 146. The templates 116 are displayed on the on-screen display unit 146 simultaneously with video. The templates 116 and the video may be displayed in a separate region of the on-screen display unit 146.

The input/output interface circuit 108 receives a web browser feed and/or a video feed. The input/output interface circuit 108 may include one or more standard communications ports found on a computing device, such as a Universal Serial Bus (USB) port, serial port, parallel port, FIREWIRE port, Ethernet port, and the like. The input/output interface circuit 108 enables the video server 102 to receive input data from external sources, e.g., the web browser feed and the video feed, and provide output data externally connected devices via the communications network 130.

The communications network is any standard communications network 130 that allows for communication between connected devices. The communications network 130 may be a wired or a wireless network, and may include an Ethernet, fibre channel network, cable TV (CATV) network, and the like.

The frame grabber 122 is a component of the video server 102, usually a peripheral computer interface (PCI) add-on card, that digitizes analog video signals such as those provided by the video feed. The frame grabber 122 generally includes a National Television System Committee (NTSC) or Phase Alternating Line (PAL) decoder circuit. The frame grabber 122 enables the video server 102 to receive input from analog video sources such as a Video Cassette Recorder (VCR), video camera, analog cable TV feed, and the like. The frame grabber 122 is electronically coupled to the video card 120 via the CPU 104. The digitized video signals are stored in memory 110 as video 150. Alternatively, the frame grabber 122 may be integrated on to the video card 120. The video signal captured by the frame grabber 122 may be further encoded by an MPEG encoded/decoder 126 present on the video card 128.

The video card 120 comprises a graphics application specific integrated circuit (ASIC) 124, the MPEG encoder/decoder 126, and an Alpha blending ASIC 128. The video card 120 may be a commercially available graphics video card such as those available from ATI or NVIDIA. The graphics ASIC 124 enables the video card 120 to display computer graphics, such as web graphics on the on-screen display unit.

The MPEG encoder/decoder 126 enables the video card 120 to encode the video feed obtained via the input/output interface circuit 108 into one or more digital video formats. In one embodiment of the invention, the MPEG encoder/decoder 126 encodes the video feed into an MPEG-2 video format; in another embodiment of the invention, MPEG encoder/decoder 126 encodes the video feed into an MPEG-4 video format. One skilled in the art will appreciate that different encoding schemes and video formats can be utilized in accordance with present invention.

The alpha blending ASIC 128 is utilized by the video card 120 to combine analog video, e.g., input from the video feed or decoded MPEG video, and the output of the graphics ASIC 124. Alpha blending is a process of combining a translucent foreground color with a background color, thereby producing a new blended color. The degree of the foreground color's translucency may range from completely transparent to completely opaque. The alpha blending ASIC 128 allows graphics generated by the graphics ASIC 124, e.g., a template 116, to be overlaid on to video generated by the MPEG encoder/decoder 126 and can utilize other combining techniques such as chroma keying that make a certain background color completely transparent. In one embodiment of the invention, the alpha blending ASIC 128 produces a combined output stream that comprises both video and graphics, i.e., video and an associated web template. Alternatively, the video server 102 may transmit components as web objects to be assembled by the set top box 132. The video server 102 transmits video, i.e., analog or digital video, a template 116, and a JAVA script that instructs the set top box 132 on how the web objects are to be assembled into a web page containing graphics and streaming video. Once the set top box 132 assembles the video and template 116 together, the combined video 150 and template 116 are displayed on the on-screen display unit 146 by the web browser 148 or other presentation application.

The set top box (STB) 132 is connected to the video server 102 via the communications network 130. The STB 132 may be a standalone unit or desktop computer that has the capability of decoding an MPEG stream. The STB 132 may also be a standalone embedded system specifically designed for displaying video signals on the on-screen display unit 146. The STB 132 comprises a central processing unit (CPU) 134, support circuits 136, a memory 138, and a graphics video card 142. The central processing unit 134 may include one or more commercially available microprocessors or microcontrollers. The support circuits 136 are well known in the art and include power supplies, clocks, input/output interface circuitry, cache and the like.

Memory 138 may comprise random access memory, read-only memory, removable memory, disk drive storage, flash memory, optical storage and various combinations of these types of memory or storage. The memory 138 is sometimes referred to as main memory and in part may be used as cache memory or buffer memory. The memory 138 stores various software packages, such as an operating system (OS) 140 and a web browser 148. The operating system 140 may be an standard operating system such as LINUX, MICROSOFT WINDOWS, OSX, and the like. The web browser may be an standard web browser such as MICROSOFT INTERNET EXPLORER, NETSCAPE NAVIGATOR, FIREFOX and the like.

The graphics video card 142 comprises an MPEG encoder/decoder 144. The MPEG encoder/decoder 144 enables the graphics video card 142 to decode MPEG-encoded video supplied from the video server 102 to the STB 132 and display the decoded video on the on-screen display unit 146.

In one embodiment of the invention, the STB 132 assembles the video, e.g., MPEG encoded video, and its associated template, e.g., a graphics template 116, together into one picture by running a script that utilizes metadata, e.g., JAVA script, Flash script and the like. The metadata provides specific instructions to the script on how to assemble the video and the template. More specifically, the metadata indicates what specific region of the template displays graphics and what specific region of the template displays the video. The assembled picture is then displayed on the on-screen display unit 146. In another embodiment of the invention, the STB 132 receives a combined output stream, i.e., the video and template are assembled into one picture by the video server 102. The STB 132 then displays the combined output stream in the appropriate region of the on-screen display unit 146.

The on-screen display unit 146 is coupled to the STB 132. The on-screen display unit 146 may be a computer monitor, a standard television set or a high-definition (HD) television set. The on-screen display unit 146 is capable of displaying video and web graphics, i.e., video and an graphics template, provided from the video server to the STB 132.

Figure 6:
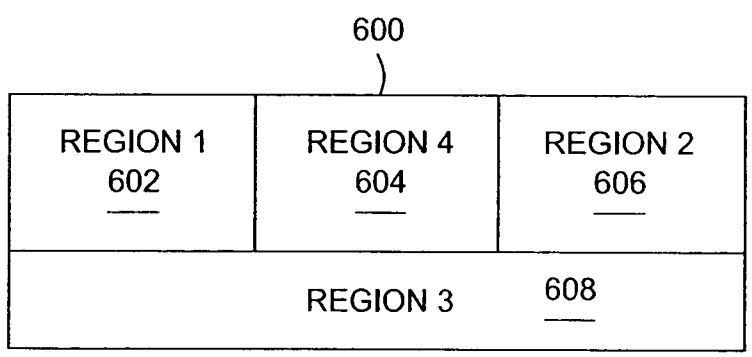
FIG. 6 is a representation of a four-region template for displaying video and graphics.

FIG. 2 is a representation of one embodiment of the schedule 118 shown in FIG. 1. The schedule 118 is an example of a schedule illustrating the operation of the present invention. The schedule comprises a list of video clips (column 202), templates (column 204), layout information (column 206), and start times (column 208). Each row 210, 212, 214, 216 represents a schedule entry and defines the template to use, the location of the graphics and video within the template, the video to use and the time at which the template/video combination will be formed and transmitted. By way of example, the video clips include videos 1, 2, and 3 and the templates include templates 1 and 2. FIG. 3 depicts template 1 and FIG. 6 depicts template 2. The layout information provides a region within the template in which graphics or video is to be displayed. The start time indicates a time when the video and template will be provided by the video server 102 to the set top box 132.

As indicated by the schedule 118, at time 0:00:00 (schedule entry 202), video 1 is combined with template 1 and delivered from the video server 102 to the set top box 132. According to the layout information of the template, graphics from template 1 are displayed in regions 2 and 3, and the video is displayed in region 1. At time 4:00:00, video 2 is combined with template 1 such that the graphics from template 1 are displayed in regions 1 and 3, and the video is displayed in region 2. The templates may be launched independently of the video, such that the video could begin playing and a template starts at a later time to provide a graphical overlay, or vice versa.

Figure 5:
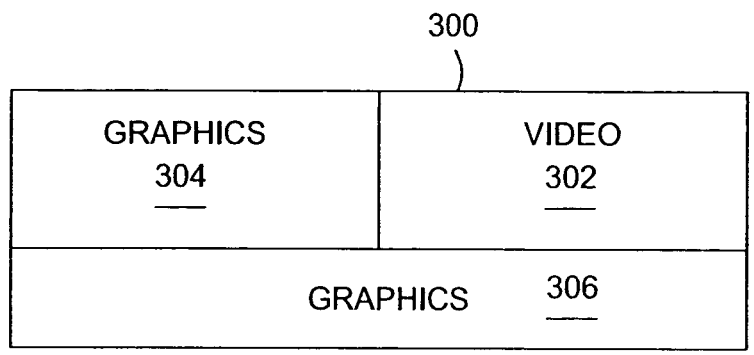
FIG. 5 is a representation of a three-region template displaying video and graphics.

FIG. 3 is a block diagram of a three-region template 300 in accordance with one embodiment of the present invention. FIGS. 4 and 5 are examples of how the present invention utilizes the three-region template 300 to display a combination of video and graphics.

The template 300 is composed of three regions, a first region 302, a second region 304, and a third region 306. Each of the regions 302/304/306 is capable of displaying either video or graphics. A video may also run full-screen independent of the template, with the entire template overlaying the video. FIG. 4 is an example of the three-region template 300 displaying video one in the first region 302 and displaying graphics in the second region 304 and in the third region 306. This combination of the template and video is defined by schedule entry 210. FIG. 5 is an example of the three-region template 300 displaying video two in the second region 304 and displaying video in the first region 302 and in the third region 306 as defined by schedule entry 212.

Figure 7:
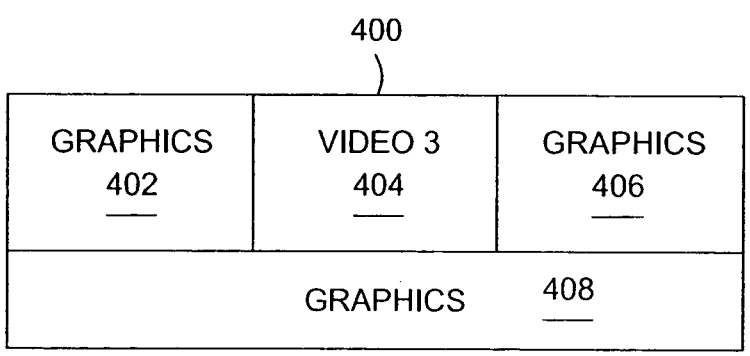
FIG. 7 is a representation of a four-region template displaying video and graphics.
Figure 8:
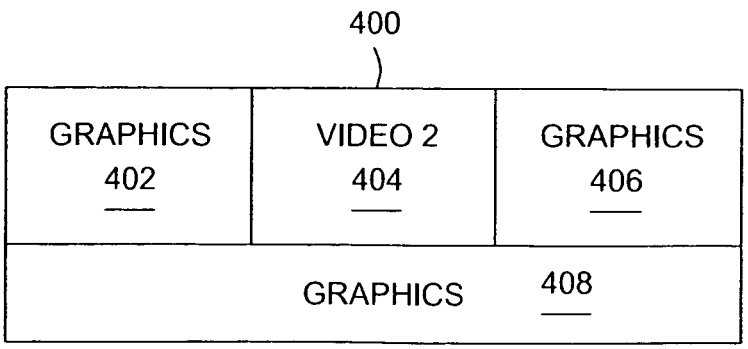
FIG. 8 is a representation of a four-region template displaying video and graphics.

FIG. 6 is a block diagram of a four-region template 600 in accordance with another embodiment of the present invention. FIGS. 7 and 8 are examples of how the present invention can utilize the four-region template 600 to schedule and transmit a combination of video and graphics together.

The four-region template 600 is composed of four regions, a first region 602, a second region 604, a third region 606 and a fourth region 608. Each of the regions 602/604/606/608 is capable of displaying either video or graphics. FIG. 7 is an example of the four-region template 600 displaying video three in the fourth region 608 and displaying graphics in the first region 602, the second region 604 and in the third region 606 as defined by schedule entry 214. FIG. 8 is an example of the four-region template 600 displaying video two in the fourth region 608 and displaying graphics in the first region 602, the second region 604 and in the third region 606 as defined by schedule entry 216.

In one embodiment of the invention the schedule 118 identifies the template and video clip combination to be created and transmitted to the viewer(s). The schedule defines the ad hoc format for the combination and can be altered at any time prior to transmission. Although two template and three video clips are discussed as examples, any number of templates and clips can be used and scheduled.

Figure 9:
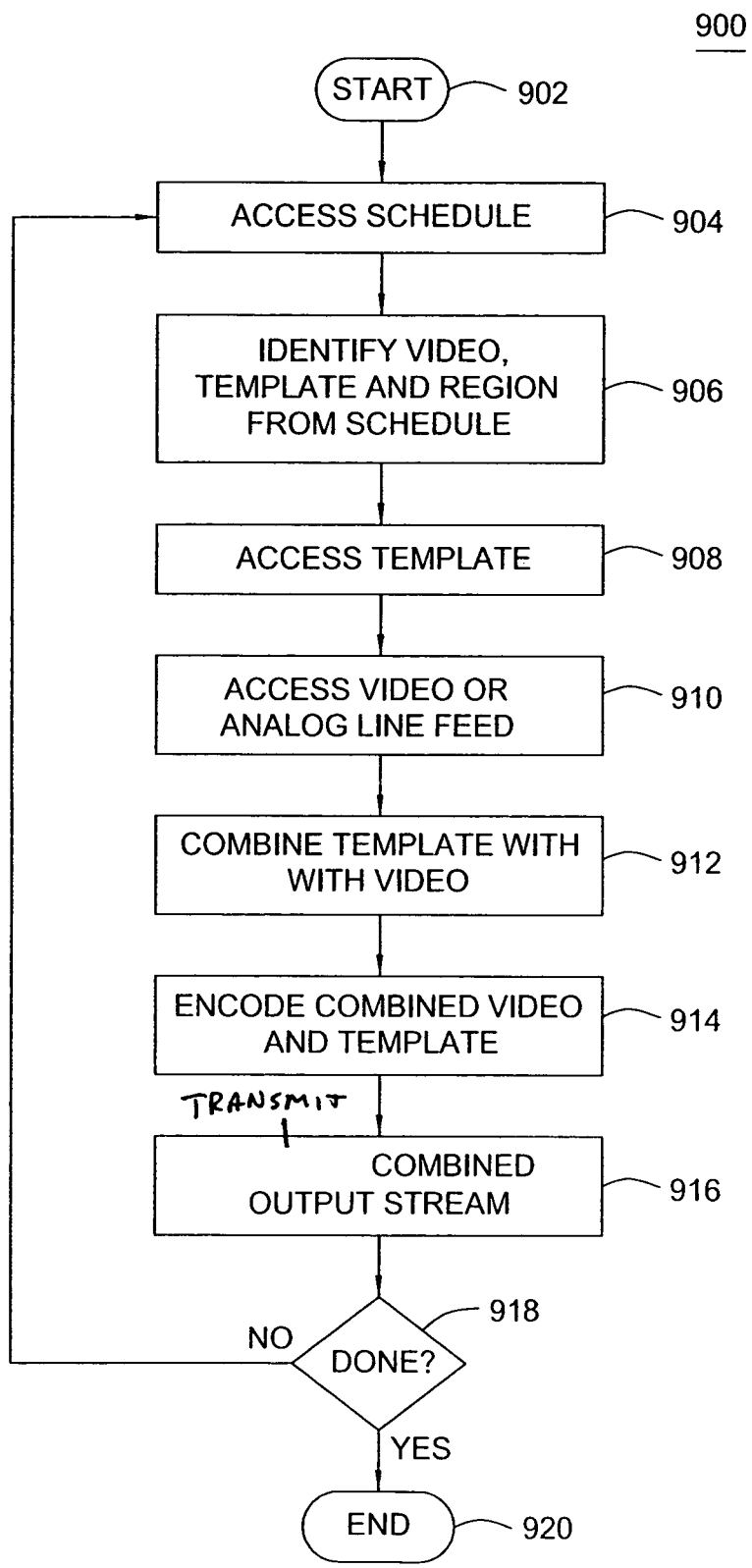
FIG. 9 is a flow diagram of a method utilized by a video server to schedule delivery of a combined output stream comprising video and graphics to an on-screen display.

FIG. 9 is a flow diagram of a method 900 utilized by a video server 102 to schedule, combine and transmit video and web content in a combined output stream to an on-screen display unit 146. The method 900 begins at step 902 and proceeds to step 904. At step 904, a schedule 118, such as the one shown in FIG. 2, is accessed by the video server 102. In one embodiment of the present invention, the schedule 118 contains a list of videos, graphical templates associated with each video, layout information defining the layout of the combination of the template and video and start times for each transmission.

At step 906, an appropriate video, e.g., an analog video stream or MPEG decoded video, and template is identified from the schedule by the video server 102 at an appropriate start time. If the schedule contains layout information, e.g., region identifying information, then an appropriate region within the template is identified for graphics and video placement. At step 908, the video server 102 accesses the graphics template identified by the schedule 118. At step 910, the video server 102 access the video identified by the schedule 118. The video may be accessed from an analog feed, or the video may be an MPEG encoded video that is decoded into an analog video stream. At step 912, an alpha-blending ASIC 128 on a video card 120 combines the video with the graphics template in accordance with the layout information within the schedule. At step 914, the combined video and graphic as template are encoded by an MPEG encoder/decoder 126 to produce a combined output stream. Optionally the combined video and audio can be delivered as analog, uncompressed, SDI, HD-SDI or other broadcast video formats.

At step 916, the combined output stream is transmitted to a set top box (STB) 132. The STB 132 displays the combined output stream on the on-screen display 146. In one embodiment of the invention, the STB 132 may be a desktop or stand alone computer system and the on-screen display may be a computer monitor. At step 914, the method 900 determines if the schedule 118 contains any further videos or web templates to be displayed on the on-screen display unit 146. If the answer is yes, i.e., the schedule contains videos and/or templates to be combined and transmitted at a later time, then the method 900 returns to step 902. If the answer is no, i.e., there are no further entries listed on the schedule 118, then the method proceeds to step 920. The method 900 ends at step 920.

In this manner, an operator can create schedules that define the transmission of templates, objects within the template regions and video using an ad hoc format, i.e., the template and video is combined for transmission "on the fly". This process provides flexibility in the transmission format, facilitates using "real time" graphics, permits "live" video feeds to be scheduled and transmitted, and so on.

Figure 10:
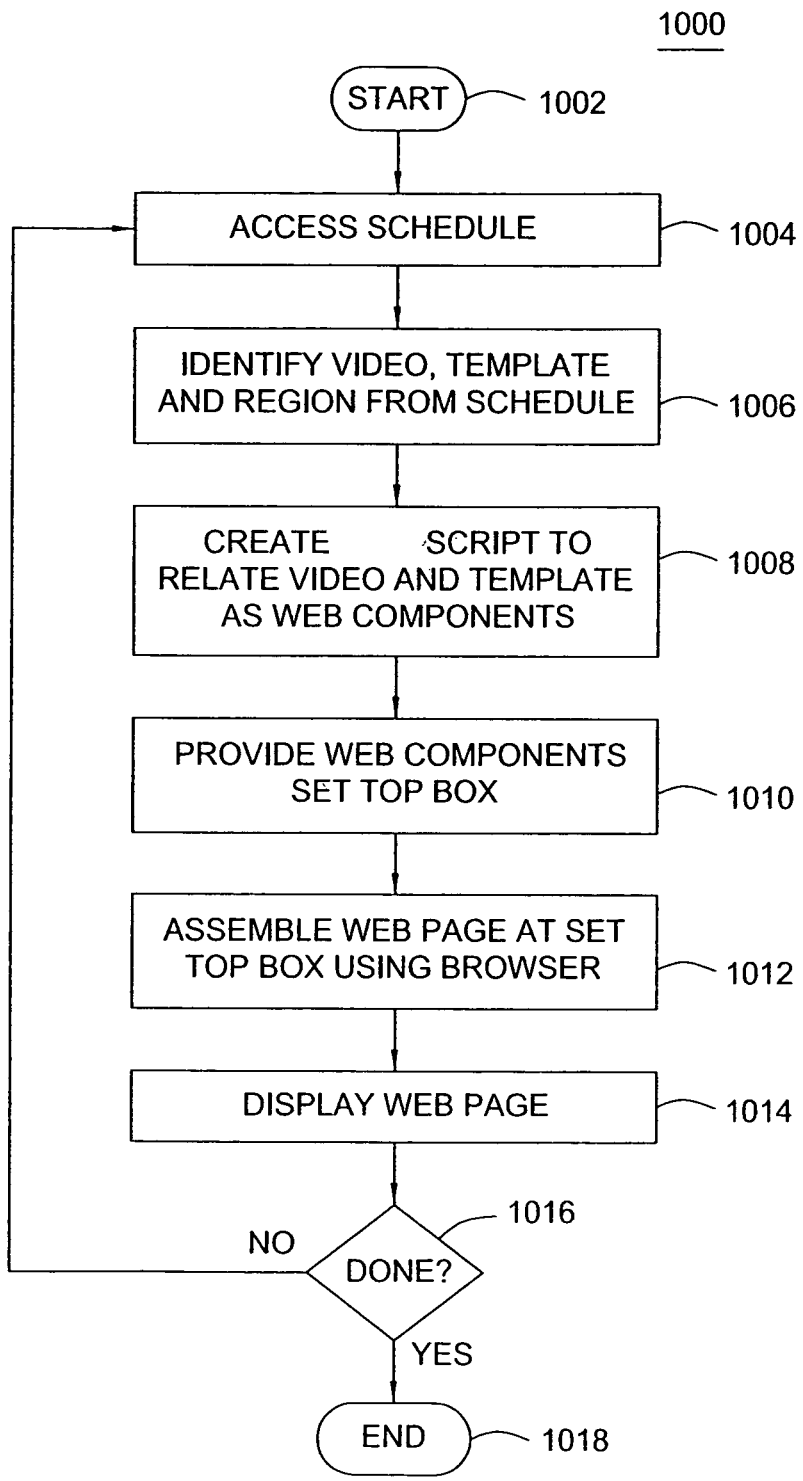
FIG. 10 is a flow diagram of a method by which a set top box can provide a combined output stream comprising video and graphics to an on-screen display.

FIG. 10 is a flow diagram of a method 1000 by which a set top box 132 can assemble video and web content together to be displayed on an on-screen display unit 146. The method 1000 is utilized by an embodiment of the present invention in which a video server 102 transmits the video stream and template as components of a web page. Metadata and a JAVA script instruct the set top box 132 on how to assemble the video stream and the template for viewing.

The method 1000 begins at step 1002 and proceeds to step 1004. At step 1004, a schedule 118, such as the one shown in FIG. 2, is accessed by the video server 102. The schedule 118 contains a list of videos, templates associated with each video, layout information defining the location of the video and graphics and a start time for each element. At step 1006, a video and template are identified from the schedule by the video server at an appropriate start time. The layout information defines the appropriate region for the video to be placed in the template. At step 1008, the video server creates or provides web code such as JAVA script and appropriate metadata to relate the video and the template as web components. At step 1010, the video server 102 provides the web components, i.e., the video and the template, to a set top box 132 along with the web code. At step 1012, the set top box 132 assembles the web components using a web browser 148 into a web page defined by the template video. At step 1014, the set top box 132 displays the assembled web components as a web page on the on-screen display unit 146. At step 1016, the method 1000 determines if the schedule 118 contains any further entries. If the answer is yes, i.e., the schedule 118 contains entries, then the method 1000 returns to step 1002. If the answer is no, i.e., there are no further entries listed on the schedule 118, then the method proceeds to step 1016. The method 1000 ends at step 1016.

The present invention provides the benefit of automatically scheduling delivery of graphics, such as web graphics, with video, for example, a broadcast news program. The computer graphics are stored in a video server as graphical templates and optionally cached on the STB, and the video server is also capable of receiving an analog video feed and digitizing the analog video. The video server combines the graphical template with the video and delivers the combined video to a set top box in accordance with a schedule. The video server may also create dynamic web code such as JAVA script that relates the video and the graphical template to each other as web components. The web components are then delivered to a set top box, and the set top box combines the web components together in accordance with the JAVA script. The combined video stream, i.e., the graphical template and video, are displayed on an on-screen display unit, such as a television or monitor. The present invention further utilizes a scheduler to automate the process of displaying the digitized video in conjunction with an appropriate web template. The graphical template enhances the digitized video because anything that may be displayed on a computer screen, e.g., animations, web graphics, transitional effects, can be displayed in conjunction with the video.

While the foregoing is directed to embodiments of the present invention, other and further embodiments of the invention may be devised without departing from the basic scope thereof, and the scope thereof is determined by the claims that follow.

The invention claimed is:

1. A method for displaying graphics and video on a display comprising:
    assembling a schedule defining transmission of at least one video, at least one template comprising multiple regions, and layout information controlling which of the multiple-regions the at least one video will be displayed, wherein the schedule is alterable in real time;
    accessing the schedule comprising the at least one video, the at least one template, and the layout information, wherein the at least one video and the at least one template are associated with each other and scheduled to be combined as defined by the layout information and transmitted for display at an at least one start time, wherein the schedule defines the format for the template and video combination, the schedule able to be altered at any time prior to transmission for display;
    accessing the at least one video and the at least one template identified by the schedule;
    creating a script to relate the at least one video and the at least one template, wherein the at least one video is a first web component and the at least one template is a second web component;
    combining the at least one video and the at least one template to form a frame sequence containing the combined at least one video and the at least one template;
    encoding the frame sequence to produce a combined output stream for display; and
    providing the combined output stream to a set top box.

2. The method of claim 1 wherein the at least one start time comprises a first start time for the at least one video and a second start time for the at least one template, where the first and second start times are different.

3. The method of claim 1, further comprising accessing the at least one video and the at least one template identified by the schedule.

4. The method of claim 1, wherein the at least one video is a decoded digital video.

5. The method of claim 1 wherein the combining step further comprises using at least one of an alpha blending technique and chroma-key combining technique.

6. The method of claim 1, further comprising relating the layout information as a third web component to the first web component and the second web component and combining, within the set top box, the first web component, the second web component, and the third web component in accordance with the script to produce the combined output stream.

7. Apparatus for creating a transmission containing graphics and video comprising:
    a scheduling interface for assembling a schedule defining transmission of at least one video, at least one template comprising multiple regions, and layout information controlling which of the multiple regions the at least one video will be displayed, wherein the schedule is modifiable alterable in real time;
    a scheduler for maintaining the schedule comprising the at least one video, the at least one template and the layout information, wherein the at least one video and the at least one template are associated with each other and scheduled to be combined into a frame sequence as defined by the layout information and transmitted at an at least one start time, wherein the schedule defines the format for the template and video combination, the schedule able to be altered at any time prior to transmission for display;

a script to relate the at least one video and the at least one template, wherein the at least one video is a first web component and the at least one template is a second web component;
a digital video encoder for encoding the frame sequence into an output stream to produce an encoded output stream for display; and
an interface for providing the combined output stream to a set top box.

8. The apparatus of claim 7 wherein the at least one start time comprises a first start time for the at least one video and a second start time for the at least one template, where the first and second start times are different.

9. The apparatus of claim 7, further comprising a digital video decoder for converting at least one digital video signal of the output stream to at least one analog video signal of the output stream.

10. The apparatus of claim 7 wherein the at least one video, at least one template and the layout information are web components.

11. The apparatus of claim 7, wherein the set top box further comprises a web browser for assembling the web components into a display.

12. A method for displaying graphics and video on a display comprising:
assembling a schedule defining transmission of at least one video, at least one template comprising multiple regions, and layout information controlling which of the multiple-regions the at least one video will be displayed, wherein the schedule is alterable in real time;
accessing the schedule comprising the at least one video, the at least one template, and the layout information, wherein the at least one video and the at least one template are associated with each other and scheduled to be combined as defined by the layout information and transmitted for display at an at least one start time, wherein the schedule defines the format for the template and video combination, the schedule able to be altered at any time prior to transmission for display;
accessing the at least one video and the at least one template identified by the schedule;
creating a script to relate the at least one video and the at least one template, wherein the at least one video is a first web component and the at least one template is a second web component;
providing the at least one video as the first web component to a set top box;
providing the at least one template as the second web component to the set top box;
combining, within the set top box, the first web component and the second web component in accordance with the script to produce a combined output stream; and
providing the combined output stream to a display.

13. The method of claim 12, wherein the at least one start time comprises a first start time for the at least one video and a second start time for the at least one template, where the first and second start times are different.

14. The method of claim 12, further comprising accessing the at least one video and the at least one template identified by the schedule.

15. The method of claim 12 wherein the combining step further comprises using at least one of an alpha blending technique and chroma-key combining technique.

16. The method of claim 12, further comprising relating the layout information as a third web component to the first web component and the second web component and combining, within the set top box, the first web component, the second web component, and the third web component in accordance with the script to produce the combined output stream.

17. The method of claim 14, wherein the at least one video is a decoded digital video.

18. Apparatus for creating a transmission containing graphics and video comprising:
a scheduling interface for assembling a schedule defining transmission of at least one video, at least one template comprising multiple regions, and layout information controlling which of the multiple regions the at least one video will be displayed, wherein the schedule is alterable in real time;
a scheduler for maintaining the schedule comprising the at least one video, the at least one template and the layout information, wherein the at least one video and the at least one template are associated with each other and scheduled to be combined into a frame sequence as defined by the layout information and transmitted at an at least one start time, wherein the schedule defines the format for the template and video combination, the schedule able to be altered at any time prior to transmission for display;
a script to relate the at least one video and the at least one template, wherein the at least one video is a first web component and the at least one template is a second web component;
an interface for providing the at least one video as the first web component and the at least one template as the second web component to the set top box, wherein the set top box combines, the first web component and the second web component in accordance with the script to produce a combined output stream; and providing the combined output stream to a display.

19. The apparatus of claim 18 wherein the at least one start time comprises a first start time for the at least one video and a second start time for the at least one template, where the first and second start times are different.

20. The apparatus of claim 18, further comprising a digital video decoder for converting at least one digital video signal of the output stream to at least one analog video signal of the output stream.

21. The apparatus of claim 18 wherein the at least one video, at least one template and the layout information are web components.

22. The apparatus of claim 18, wherein the set top box further comprises a web browser for assembling web components into a display.

* * * * *